United States

[11] 3,612,653

| | | |
|---|---|---|
| [72] | Inventor | Jan Aleksander Rajchman<br>Princeton, N.J. |
| [21] | Appl. No. | 4,304 |
| [22] | Filed | Jan. 20, 1970 |
| [45] | Patented | Oct. 12, 1971 |
| [73] | Assignee | RCA Corporation |

[54] DIGITAL LIGHT DEFLECTOR HAVING LIQUID AND VAPOR STATES
6 Claims, 8 Drawing Figs.

[52] U.S. Cl. .................................................. 350/160
[51] Int. Cl. .................................................. G02f 1/34
[50] Field of Search .................................... 350/160, 161

[56] References Cited
UNITED STATES PATENTS

| | | | |
|---|---|---|---|
| 3,307,897 | 3/1967 | Lohmann | 350/160 |
| 3,415,591 | 12/1968 | Letter | 350/160 |
| 3,501,220 | 3/1970 | Bernal et al. | 350/160 |

Primary Examiner—Ronald L. Wibert
Assistant Examiner—V. P. McGraw
Attorney—H. Christoffersen ABSTRACT: A digital light deflector is disclosed which includes an electrically conductive, transparent film deposited on a transparent substrate. The transparent film is made very thin so that it has a resistance to the flow of electric current and acts as a heating element. The transparent film is immersed in a transparent liquid in a transparent container. Light is directed through the container to the film at an angle therewith. The light normally continues in a straight line through the film, the liquid and out from one side of the container. When an electric current is applied to the film, heat is generated which vaporizes the liquid at the surface of the film and causes the light to be reflected by the film-vapor interface and pass out through a different side of the container.

PATENTED OCT 12 1971　　　　　　　　3,612,653

INVENTOR.
Jan A. Rajchman
BY Carl V. Olson
ATTORNEY

INVENTOR.
Jan A. Rajchman
BY
ATTORNEY

DIGITAL LIGHT DEFLECTOR HAVING LIQUID AND VAPOR STATES

BACKGROUND OF THE INVENTION

There are many applications for a digital light deflector capable of deflecting a beam of light to one of two directions, or to one of many discrete directions. Such light deflectors are needed, for example, in optical memories for use with computers, and in various information display equipments.

SUMMARY OF THE INVENTION

It is an object of the invention to provide an improved digital light deflector which is simple, inexpensive, reliable, provides large deflection angles, has good optical contrast ratio, deflects light beams of any size, has an operating speed of less than a millisecond, and has no mechanically moving parts. The light deflector operates by transmitting a light beam through a transparent electrode in a transparent liquid, and by reflecting the light beam when electric current through the transparent electrode produces heat and causes a thin sheet of vapor to form on the electrode.

DESCRIPTION OF THE PREFERRED EMBODIMENTS

Figure 1:
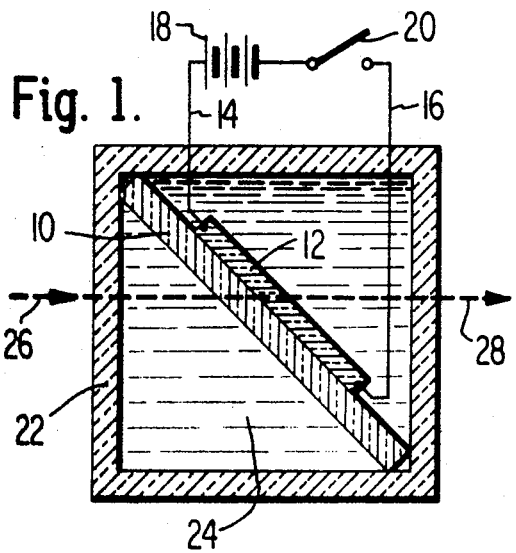
FIG. 1 is a sectional view of an optical element according to the invention showing a light beam transmitted therethrough.

Referring now in greater detail to FIG. 1, there is shown a transparent substrate 10 having a thin transparent electrically conductive film 12 deposited therein. Opposite edges of the conductive film 12 are connected by wires 14 and 16 to an electric pulse generator represented as a series circuit including a battery 18 and a switch 20. The substrate 10 and conductive film 12 are positioned in a transparent container 22 which is filled with a transparent liquid 24.

The transparent substrate 10 and transparent container 22 are preferably constructed of pyrex glass because this material is unaffected by corrosive liquids, because it can withstand high temperatures required for depositing the conductive film 12, and because it has a high refractive index equal to 1.474.

The conductive film 12 is preferably a thin layer of tin oxide, generally referred to as TIC. This material has an optical transmissivity of 80 percent or better, and can be formed on a substrate with an electrical resistance anywhere in the range from 50 ohms per square up to 50,000 ohms per square. Tin oxide is also chemically inert in the presence of corrosive organic liquids. The tin oxide layer of film may be formed on a glass substrate by known techniques such as spraying, vapor deposition, and radiofrequency sputtering. The sputtering technique is preferred using an antimony-doped tin oxide. The glass substrate is kept at a temperature of 200° C. during the sputtering, and a subsequent annealing is accomplished at 300° C. The tin oxide film is typically formed with a thickness of about 1,000 A. Vapor deposited tin oxide has a refractive index of 1.77, and radiofrequency sputtered tin oxide has a refractive index of about 2.01. The wires 14 and 16 may be connected to edges of the tin oxide film 12 by indium soldering. Alternatively, the wires 14 and 16 may be tungsten wires suitable for withstanding the formation of a metal to glass seal where they pass through the wall of the enclosure 22. The tungsten wire may be soldered with high-temperature solder to nickel lands plated on opposite edges of the tin oxide film 12.

Since the tin oxide film and the glass substrate 10 have different refractive indices, it may be desirable to employ an optical quarter-wave coating between the tin oxide film 12 and the glass substrate 10, or on top of the tin oxide film 12. The quarter-wave coating is preferably made of silicon monoxide.

The transparent container 22 is filled with a transparent liquid 24 which is preferably trichloroethylene. This liquid is particularly suitable because its refractive index (1.478) very closely matches the refractive index of pyrex glass (1.474) and because it has other desirable physical, chemical, mechanical, optical, and thermal properties.

The amount of electrical energy required in the operation of the optical element shown in FIG. 1 can be reduced by adding a nonwettable coating to the tin oxide film 12. A suitable nonwettable materials include fluorochemical polymers. A further reduction in electrical energy needed is obtained when the enclosure 22 is constructed as a hermetically sealed container in which the pressure is reduced to equal the vapor pressure of the liquid, so that the boiling point of the liquid is reduced and only the latent heat energy need to be supplied to obtain vaporation.

Figure 2:
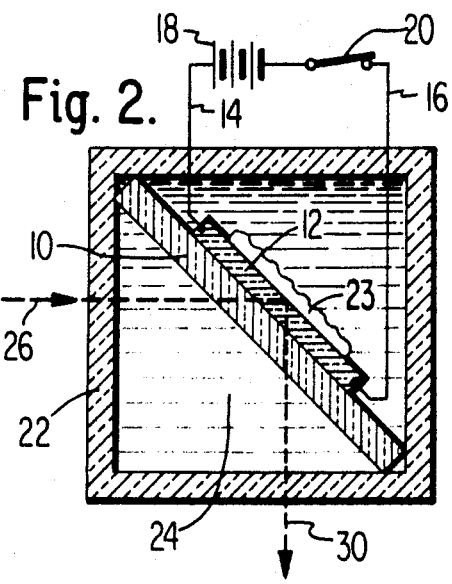
FIG. 2 is a section view of the optical element shown in FIG. 1 when energized to reflect the incident light beam.

In the operation of the light deflector shown in FIGS. 1 and 2, an incident light beam 26 is applied through the transparent container 22, through the transparent liquid 24, diagonally through the transparent substrate 10 and the transparent conductive film 12, and then continuing through the transparent liquid and transparent container as an undeflected output light beam 28.

When the deflection of the incident light beam 26 is desired, an electrical current pulse is applied through the conductive film 12 such as by closing the switch 20, as shown in FIG. 2. The current pulse through the electrically conductive film 12 causes a generation of heat in the film which results in a vaporation of a thin layer of the transparent liquid. The film or layer of vapor 23 has a refractive index of about 1.00, which is significantly different from the refractive index of the liquid (1.47) and the conductive film (1.77, or 2.01). The film of vapor 23 causes the input light beam 26, which is diagonally incident to the interface between the conductive film 12 and the vapor film 23, to be totally reflected at an angle of reflection equal to the angle of incidence. The reflected beam exits from the transparent container 22 as a deflected output beam 30. When the switch 20 is subsequently opened, the vapor 23 immediately condenses into liquid, and the input light beam is again directed through the optical element.

The time required for creating the vapor film 23 may typically be less than 1 millisecond, and permit a cycling between the two directions at a maximum rate between 1 and 10 kHz. The electrical power required may be in the range of between 10 and 20 watts per square centimeter of controlling surface. A deflector constructed according to FIGS. 1 and 2 was found, when unenergized, to transmit more than 99 percent of the incident light beam 26 as a transmitted output beam 28, and to reflect about 0.67 percent of the incident light beam in the output direction 30. When the deflector was electrically energized, nearly 100 percent of the incident light beam 26 was reflected as an output beam 30. Stated another way, the deflector exhibited a contrast ratio of 150 to 1.

Figure 3:
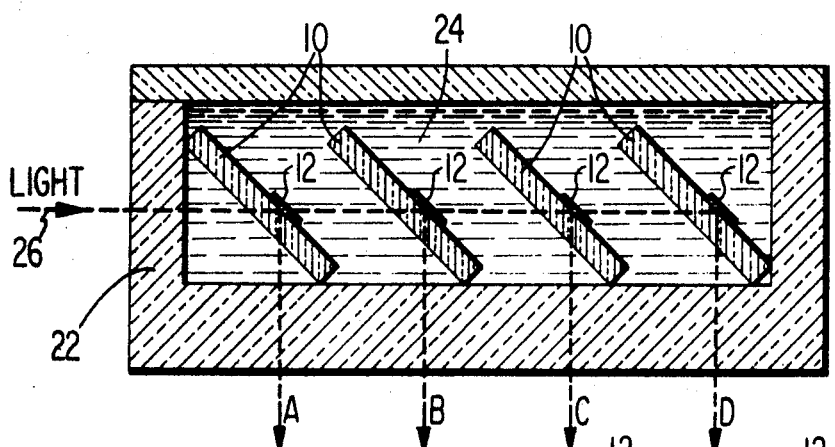
FIG. 3 is a sectional view of a light deflector for directing an incident light beam to any one of four parallel output paths.

FIG. 3 shows a light deflection system including four elements like the one shown in FIG. 1 arranged in tandem. The incident light beam 26 normally passes through all four of the light deflection elements. By electrically energizing the conductive film 12 on any one of the elements, the beam can be made to exit from the transparent container 22 along any selected one of the output paths labeled A, B, C, D.

Figure 4:
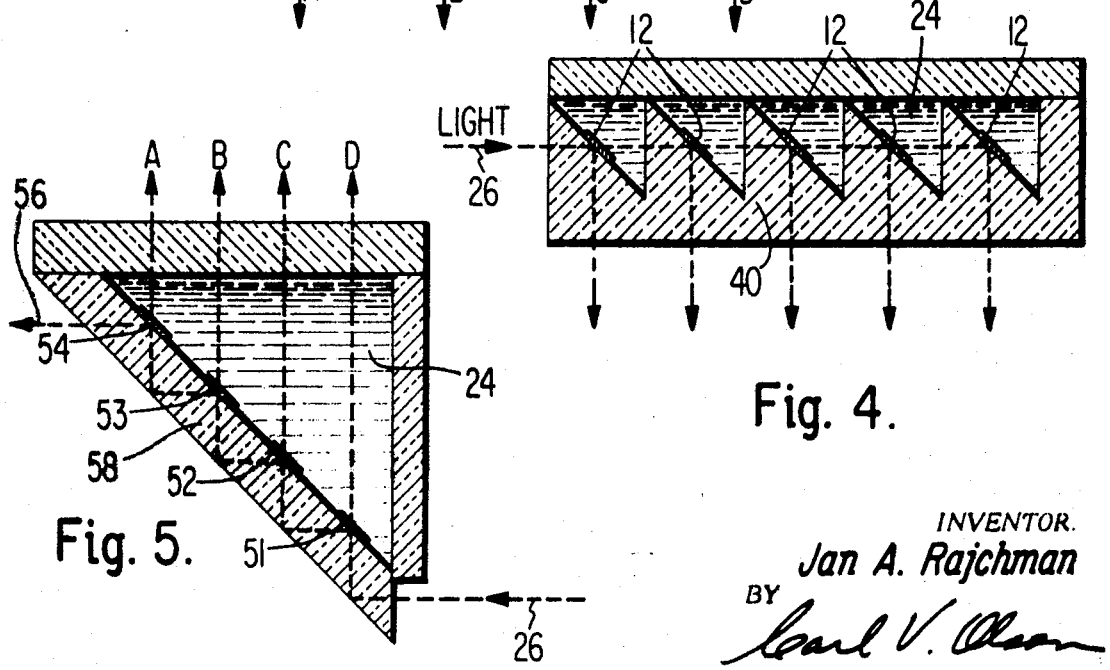
FIG. 4 is a sectional view of a light deflector similar to FIG. 3 but employing different construction.

FIG. 4 shows a similar arrangement employing a slightly different construction in that a single piece of transparent optical glass 40 is provided with diagonally facets supporting the transparent conductive films 12.

Figure 5:
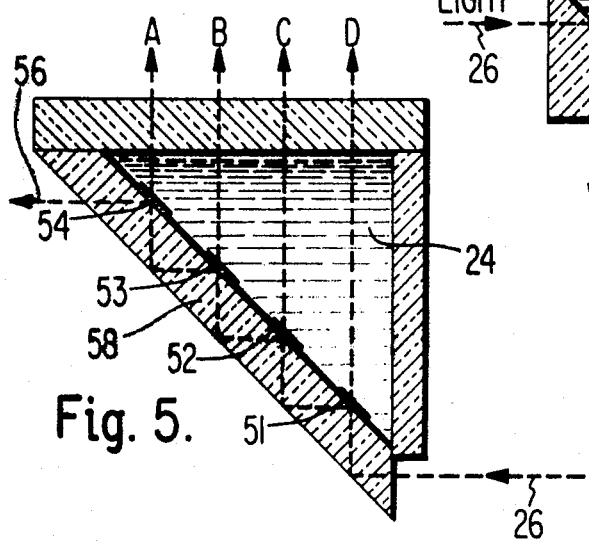
FIG. 5 is a sectional view of a multiple-output light deflection constructed to reduce light attenuation in the deflector.

FIG. 5 is another construction of a deflector providing multiple parallel outputs in an arrangement designed to minimize optical losses by normally relying on successive reflections, rather than successive transmittances. In operation, the conductive films 51, 52, 53 and 54 are normally energized to produce an output beam 56. The light beam in traversing the glass member 58 by multiple reflection is only very slightly attenuated. An output beam is made to exit from the transparent container along any one of the parallel output paths A, B, C, and D by interrupting the energization of an appropriate one of the transparent conductive films 54, 53, 52, and 51, respectively.

Figure 6:
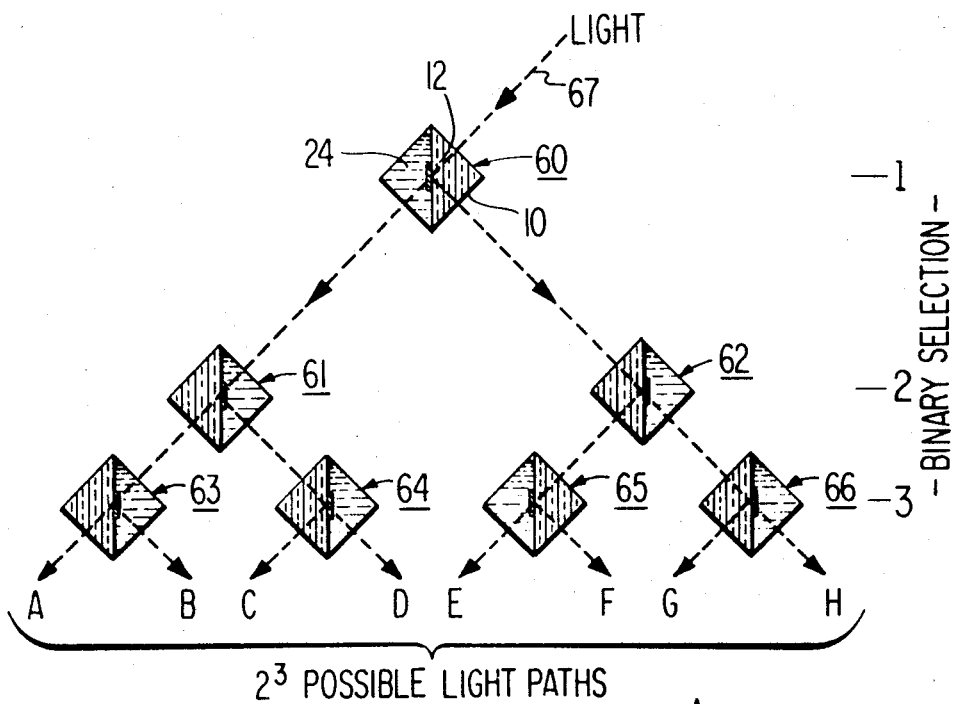
FIG. 6 is a sectional view of a system of light deflecting optical elements arranged to constitute a three-level selection tree.

FIG. 6 shows an optical deflection selection tree including an optical deflection element 60 at a first binary selection level, optical deflection elements 61 and 62 at a second binary selection level and optical deflection elements 63, 64, 65 and 66 at a third binary selection level. Each of the deflection elements 60–66 includes a glass substrate 10, a transparent conductive film 12 and a transparent liquid 24. Each element allows an incident light beam to pass directly therethrough, or be reflective at an angle of 90°. The incident light beam 67 is deflected to any one of the output beam positions A through H by controlling the energized or unenergized condition of the deflection elements in the three binary selection levels of the selection tree.

Figure 7:
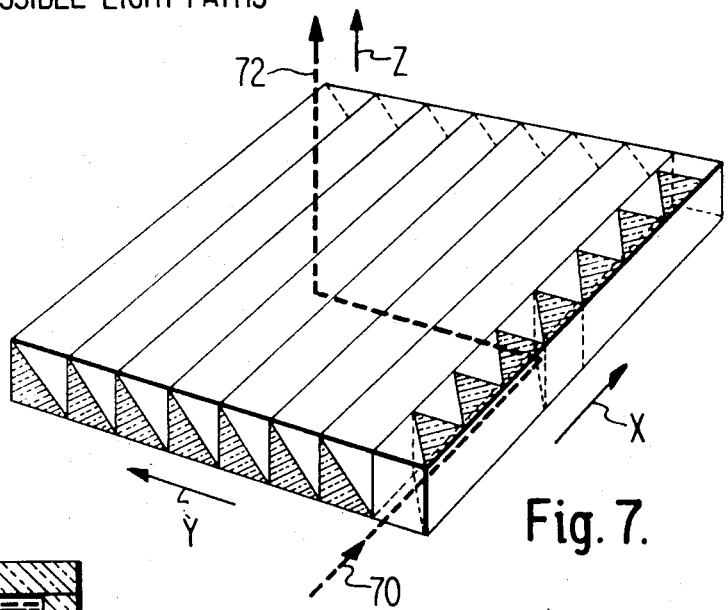
FIG. 7 is a perspective view of a system for deflecting an incident beam from any one of many positions along an X-axis, to any one of many positions along a Y-axis to therefrom produce an output beam parallel to a Z-axis.

FIG. 7 is a system employing a number of deflection elements arranged along a X-axis, and a number of deflection elements arranged along a Y-axis. An incident light beam 70 is caused to be reflective at right angles by any energized one of the optical deflection elements arranged along the X-axis. The thus reflected beam is again reflected by any selected energized one of the elongated deflection elements arranged along the Y-axis. The single selected output beam 72 then follows a path parallel with the Z-axis of the system.

Figure 8:
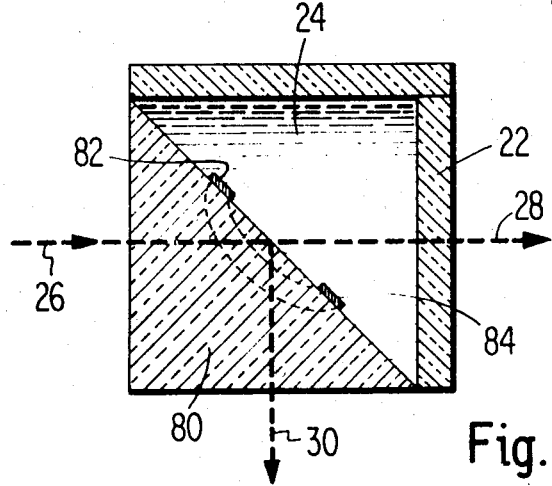
FIG. 8 is a sectional view of an optical deflection element constructed to include electrically conducting glass.

FIG. 8 illustrates a deflector element constructed differently from the element of FIG. 1 in that no film of electrically conductive material on a substrate is employed. Rather, the substrate 80 is itself made of an electrically conductive glass. Electric terminals 82 and 84 are formed on the diagonal face of the electrically conducting glass 80. An electrical potential applied to the terminals 82 and 84 causes a current through the conductive glass 80 which heats the liquid between the terminals to produce a reflecting vapor film.

What is claimed is:

1. An optical element comprising
   a transparent conductor,
   a transparent liquid on a surface of said transparent conductor,
   means to direct an incident light through said transparent conductor and said transparent liquid, and
   means to apply an electric current through said transparent conductor to cause a heating and vaporization of liquid on the surface of said conductor, whereby said light is reflected from the interface between said transparent conductor and said vapor.

2. The combination of claim 1 wherein said conductor is a conductive sheet, and wherein said incident light is directed at an acute angle to said conductive sheet.

3. The combination of claim 2 wherein said incident light is directed at an angle of 45° to said conductive sheet.

4. The combination of claim 2 wherein said conductive sheet is a transparent conductive film on a transparent substrate.

5. The combination of claim 2, and in addition, a transparent container for containing said transparent conductive sheet and said transparent liquid.

6. The combination of claim 2, and in addition, a plurality of additional optical elements each as defined by claim 2 arranged as a binary selection tree.